US009786484B2

(12) United States Patent
Willis et al.

(10) Patent No.: US 9,786,484 B2
(45) Date of Patent: Oct. 10, 2017

(54) METHOD AND APPARATUS FOR DECODING MULTIPLEXED INFORMATION IN A CHROMATOGRAPHIC SYSTEM

(71) Applicant: LECO Corporation, St. Joseph, MI (US)

(72) Inventors: Peter Markel Willis, Benton Harbor, MI (US); Jonathan Jaloszynski, Saint Joseph, MI (US)

(73) Assignee: LECO Corporation, St. Joseph, MI (US)

( * ) Notice: Subject to any disclaimer, the term of this patent is extended or adjusted under 35 U.S.C. 154(b) by 0 days.

(21) Appl. No.: 15/311,566

(22) PCT Filed: May 15, 2015

(86) PCT No.: PCT/US2015/031173
§ 371 (c)(1),
(2) Date: Nov. 16, 2016

(87) PCT Pub. No.: WO2015/175988
PCT Pub. Date: Nov. 19, 2015

(65) Prior Publication Data

US 2017/0084443 A1 Mar. 23, 2017

Related U.S. Application Data

(60) Provisional application No. 61/994,391, filed on May 16, 2014.

(51) Int. Cl.
*H01J 49/00* (2006.01)
*H01J 49/26* (2006.01)
(Continued)

(52) U.S. Cl.
CPC .......... *H01J 49/40* (2013.01); *H01J 49/0027* (2013.01); *H01J 49/10* (2013.01)

(58) Field of Classification Search
USPC ....... 250/281, 282, 285–288, 290, 292, 294, 250/299
See application file for complete search history.

(56) References Cited

U.S. PATENT DOCUMENTS 5,367,162 A * 11/1994 Holland .................. H01J 49/40 250/283
6,900,431 B2 * 5/2005 Belov .................. H01J 49/401 250/282
(Continued)

FOREIGN PATENT DOCUMENTS

WO WO-2006049623 A2 5/2006

OTHER PUBLICATIONS

International Search Report dated Aug. 26, 2015, relating to International Application No. PCT/US2015/031173.

*Primary Examiner* — Bernard Souw
(74) *Attorney, Agent, or Firm* — Honigman Miller Schwartz and Cohn LLP

(57) ABSTRACT

Implementations of methods and apparatuses are disclosed for decoding multiplexed information in a chromatographic system. Implementations may include the method of pulsing ions from an ion source through an analyzer according to a predetermined multiplexing scheme, each pulse including one or more ions corresponding to a sample, detecting a plurality of ion strikes at a detector, determining a data point for each ion strike, wherein each data point includes an intensity of a detected ion strike and a time of the detected ion strike, maintaining a multiplexed spectrum of the data points, the multiplexed spectrum including the data points, and demultiplexing the time shifted spectrum using the data points of the multiplexed spectrum.

21 Claims, 9 Drawing Sheets

(51) Int. Cl.

| | |
|---|---|
| ***H01J 49/28*** | (2006.01) |
| ***B01D 59/44*** | (2006.01) |
| ***H01J 49/40*** | (2006.01) |
| ***H01J 49/10*** | (2006.01) |

(56) References Cited

U.S. PATENT DOCUMENTS

| | | | | |
|---|---|---|---|---|
| 7,217,919 | B2 * | 5/2007 | Boyle .................... | H01J 49/107<br>250/281 |
| 2005/0001163 | A1 * | 1/2005 | Belov .................... | H01J 49/401<br>250/290 |
| 2009/0114808 | A1 | 5/2009 | Bateman | |
| 2010/0001180 | A1 | 1/2010 | Bateman | |
| 2010/0078551 | A1 | 4/2010 | Loboda | |
| 2013/0048852 | A1 | 2/2013 | Verenchikov | |
| 2015/0194296 | A1 * | 7/2015 | Verenchikov ....... | H01J 49/0027<br>250/282 |

* cited by examiner

METHOD AND APPARATUS FOR DECODING MULTIPLEXED INFORMATION IN A CHROMATOGRAPHIC SYSTEM

CROSS REFERENCE TO RELATED APPLICATIONS

This U.S. patent application is a national stage application of International Application No. PCT/US2015/031173, filed May 15, 2015, which claims priority under 35 U.S.C. §119(e) to U.S. Provisional Application 61/994,391, filed on May 16, 2014. The disclosures of these prior applications are considered part of the disclosure of this application and are hereby incorporated by reference in their entireties.

TECHNICAL FIELD

This disclosure relates to a method and apparatus for encoding and decoding multiplexed chromatographic-mass spectral information.

BACKGROUND

In a time-of-flight (TOF) mass spectrometer (MS), ions are accelerated with substantially constant energy. It is understood that the light ions will travel faster than the heavier ions. The time an ion travels a fixed distance is measured. Accordingly, an ion's mass can then be calculated from this time of flight.

If the distance travelled by the ions is short, then ions of similar mass have substantially similar (short) flight times. In some instances, these similar times can result in ions of similar masses being indistinguishable from each other, which yields low resolution results.

To increase the resolution from this phenomenon, it is known to increase the distance (thereby the flight time) for the ions to travel. In such an implementation, the total time of flight for all ions is increased. This longer flight time, while increasing resolution, can have shortfalls as it acts to limit how frequently the mass spectrometer can accelerate groups of ions. This, in turn, limits sensitivity. It places a lower bound on the concentrations that can be detected.

In a traditional, non-multiplexed TOF MS, a group of ions is accelerated. Then the MS waits until all of the ions in the group have arrived at the detector (the end of the flight path). Only then can the next group of ions be accelerated. Long flight times limit how frequently ions can be accelerated, resulting in decreased sensitivity.

Generally

Implementations of multiplexed high resolution mass spectrometry are disclosed to allow the mass spectrometer to avoid waiting for all ions from one group to arrive at the detector before accelerating a next group thereby facilitating ions from many different groups to be simultaneous in flight. As a result, this increases the number of ions that traverse the flight path in a given amount of time.

In a traditional mass spectrum system, the data reported by the detector from such an arrangement is not recognizable as the data is a shifted sum of mass spectra from the individual ion groups, referred herein as a "multiplexed spectrum". By multiplexing the timing of the groups of accelerated ions as discussed, one can thereafter utilized methods to convert this multiplexed spectrum into traditional mass spectrum, which will be referenced herein as demultiplexing. In summary, multiplexing in the mass spectrometer and thereafter demultiplexing in software facilitates the system to simultaneously maintain high resolution & high sensitivity. Additional, the disclosed implementations can also improve spectral selectivity. In other words, traditional mass spectra can contain artifacts from stray ions or spontaneous detector emissions whereas application of implementations of demultiplexing can confirm a presence of a spectral peak thereby effectively filtering such spectral artifacts.

Traditional Mass Spectrometer

A chart illustrating exemplary results from a traditional time-of flight mass spectrometer is provided at FIG. 1. As illustrated, the results depict a mass spectrum that contains information meaningful to an analytical chemist. The locations of the spectral peaks correspond to the time of flight of each ion and to the measured mass of each ion received by the detector.

SUMMARY

Implementations of methods and apparatuses are disclosed for for decoding multiplexed information in a chromatographic system. Implementations may include the method of pulsing ions from an ion source through an analyzer according to a predetermined multiplexing scheme, each pulse including one or more ions corresponding to a sample, detecting a plurality of ion strikes at a detector, determining a data point for each ion strike, wherein each data point includes an intensity of a detected ion strike and a time of the detected ion strike, maintaining a multiplexed spectrum of the data points, the multiplexed spectrum including the data points, and demultiplexing the time shifted spectrum using the data points of the multiplexed spectrum.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

Figure 2:
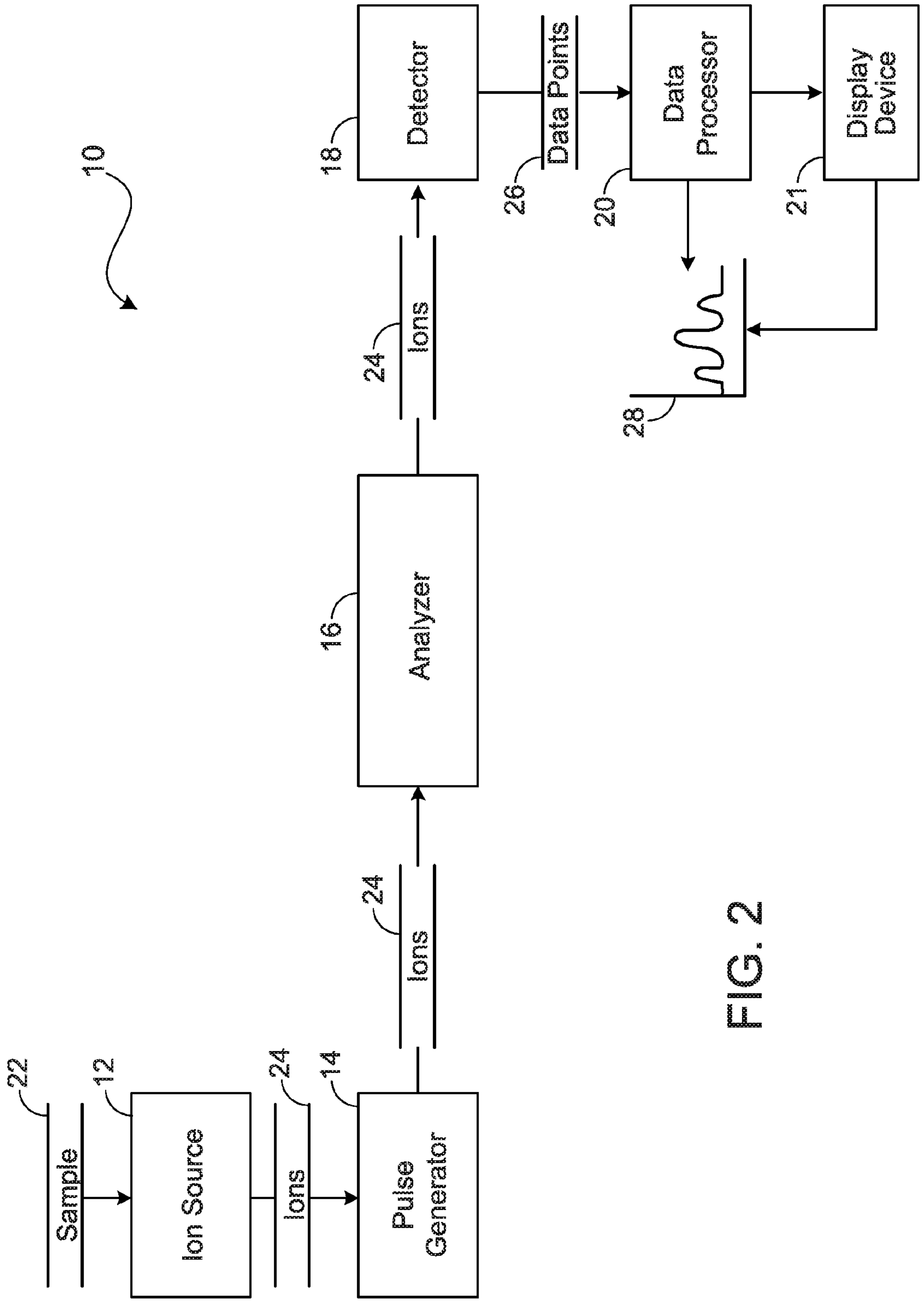
FIG. 2 is a schematic illustrating an example mass spectrometer according to some implementations of the present disclosure.

With reference now to FIG. 2, an example mass spectrometer 10 configured to multiplex or encode ion packets and demultiplex or decode resulting ion strikes is disclosed. As illustrated, the mass spectrometer 10 is a time-of-flight mass spectrometer. It is noted, however, that the present disclosure relates to any suitable mass spectrometer. In some implementations, the mass spectrometer 10 includes an ion source 12, a pulse generator 14, an analyzer 16, a detector 18, a data processor 20, and a display device 21. It is noted that the mass spectrometer 10 may include additional components not depicted in FIG. 2.

In operation, a sample 22, e.g. an analyte, is inserted into the ion source 12. The sample 22 can be a solid, liquid, or gas. The ion source 12 creates charged particles, i.e., ions, from the sample 22. The ion source 12 can be any suitable ion source 12. For instance, the ion source 12 can be an electron ion source, a chemical ion source, a radioactive ion source, an ion-attachment ion source, a gas discharge ion source, or any other type of ion source. The ion source 12 can be a MALDI ion source, a DE MALDI ion source, a SIMS ion source, an LD ion source, or an EI ion source with pulsed extraction. The ion source 12 outputs ions 24 to the pulse generator 14.

Figure 3:
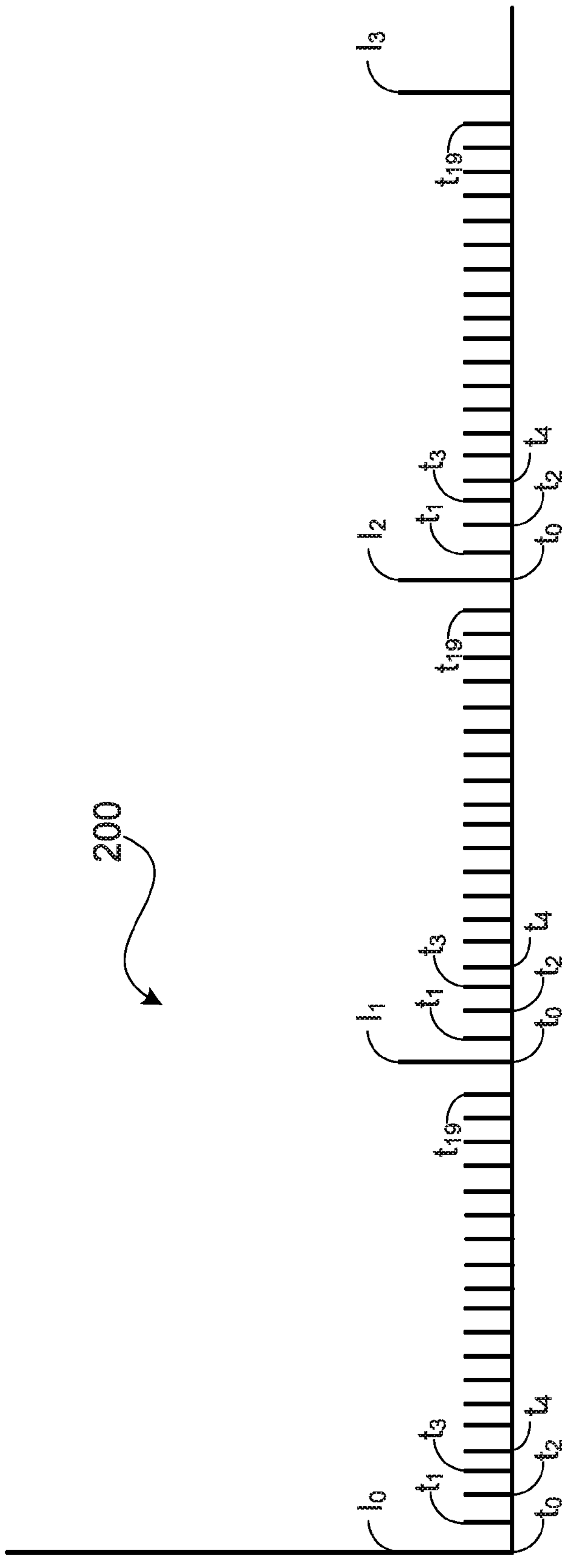
FIG. 3 is a drawing illustrating an example of a multiplexing scheme according to some implementations of the present disclosure.

The pulse generator 14 receives ions 24 from the ion source 12 and pulses the ions 24 through the analyzer 16 at predetermined intervals. In some implementations, the pulse generator 14 is configured or controlled to perform multiplexed pulsing of the ions 24, such that the ions 24 are pulsed into the analyzer 16 according to a multiplexing scheme. In some implementations, the multiplexing scheme can be a non-periodic and/or pseudo random encoding. FIG. 3 illustrates an example of a multiplexing scheme 200. In such an exemplary multiplexing scheme, each pulse interval, I, is separated into subintervals, t. The subintervals, t, are approximately equal in duration, but not equal. Furthermore, the duration of each interval may be unique. To the extent an interval contains non-unique intervals, the non-unique intervals are not spaced apart in a periodic manner. Thus, the subintervals, t, are non-periodic. In the illustrated example, each interval, e.g., $I_0$, $I_1$, $I_2$ . . . , contains 20 subintervals, $t_0$, $t_1$, $t_2$, $t_3$, . . . $t_{19}$. In this example, each subinterval has different time duration. For example, the pulse generator 14 may be configured or controlled to pulse the ions 24 at intervals I that are approximately equal to one ms and the multiplexing scheme may divide the each interval I into twenty subintervals t. In such a scenario, an example set of time durations may be $t_1$=50.15 μs, $t_1$=49.85 μs, $t_2$=49.89 μs, $t_3$=49.93 μs, $t_4$=49.79 μs . . . $t_{19}$=50.37 μs, such that each time subinterval t is approximately equal to 50 μs unique. According to the multiplexing scheme 200, the subintervals, $t_0$, $t_1$, $t_2$, $t_3$, . . . $t_{19}$, are repeated for each interval, $I_0$, $I_1$, $I_2$ . . . $I_n$. A time interval may be referred to as substantially unique if the value of the interval is never repeated or is repeated one or more times but in a non-periodic or consecutive manner.

It is noted that multiplexed pulsing of ions offers a dramatic increase in both the LOD and DR for HRTOFMS system. In this concept, the duty cycle can be increased by pulsing multiple ion packets per transient period, i.e., interval, in an overlapped encoded sequence. The multiplexing scheme, i.e., encoding, is designed to reduce occurrences of overlapped ion strikes from consecutive or nearly consecutive ion pulses. High concentration ions are dispersed throughout the multiplexed spectra, so saturation and space-charge are not limiting factors as compared to ion trapping techniques. One prerequisite for successful multiplexing HRTOFMS is that the mass spectra are sufficiently sparse to keep the number of spectral interferences manageably low. This requirement matches well with the sparseness of GC, GCxGC HRT, GC-MS/MS, GC-IMS-MS, LC-MS/MS, LC-IMS/MS or any other combination of separation techniques that generates sparse spectral data.

The detector 18 receives ions 24 via the analyzer 16. The detector 18 can be, for example, a microchannel plate (MCP), a secondary multiplier (SEM), or a hybrid with intermediate scintillator. In some implementations, the detector 18 has an extended life time and dynamic range to handle ion fluxes of at least up to 1 E+8 ions/sec in order to match up to 10+10 ion/sec flux from ion sources at the expected 5-20% overall duty cycle of the tandem 11. In some implementations, the detector 18 includes a photomultiplier (PMT) with life time of 100-300 Coulomb of the output current.

Figure 6:
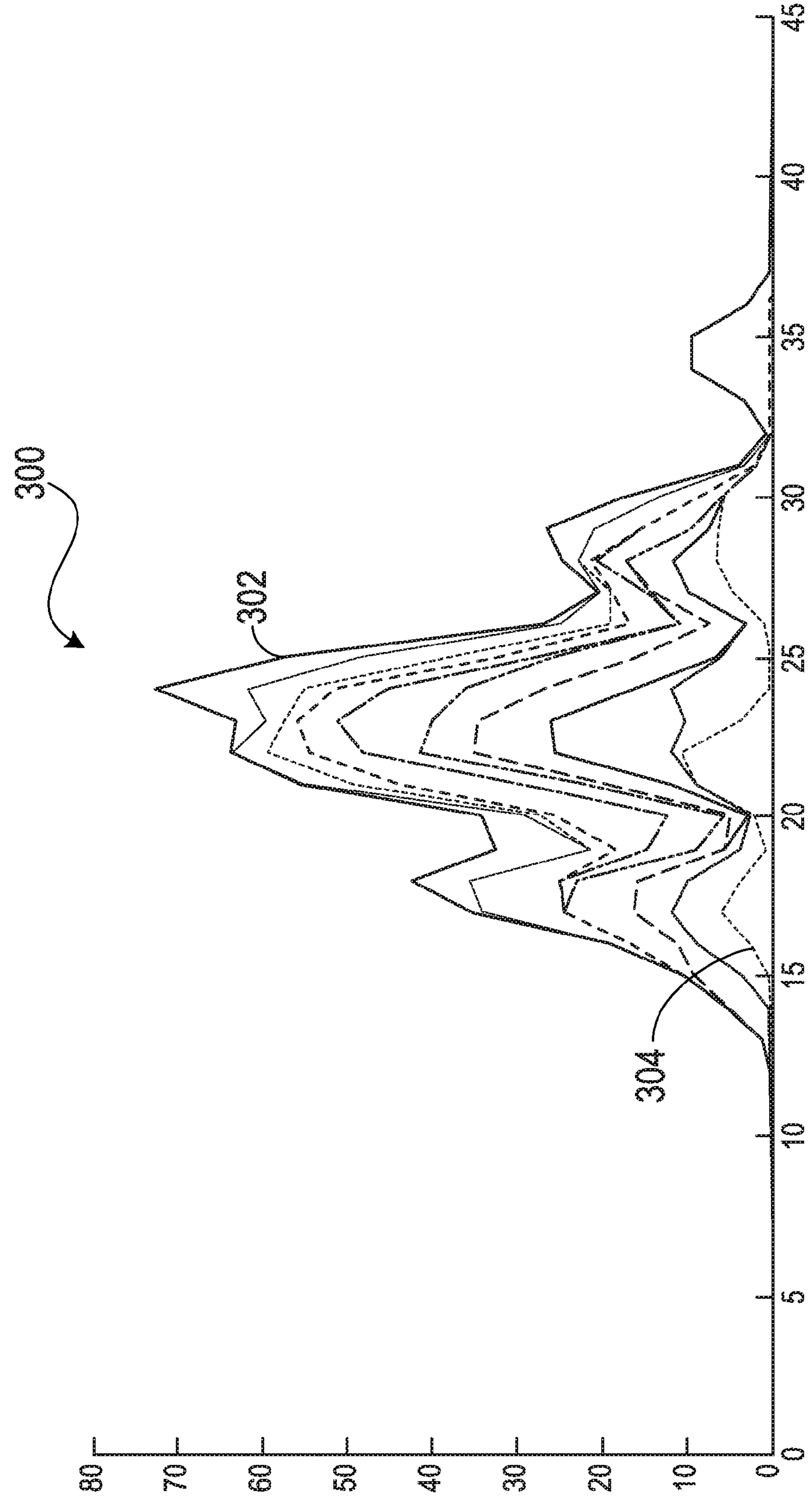
FIG. 6 is a drawing illustrating an example of multiplexed spectra according to some implementations of the present disclosure.

Each time the detector 18 is struck with one or more ions 24, the detector 18 outputs a data point 26 corresponding to the ion strike. In some implementations, the data point 26 is an ordered pair, (intensity, time), where intensity is a value indicating an intensity of the strike, e.g., mass/charge and time is the time of the strike relative to the beginning of interval $I_0$. For example, if an ion strike of intensity 67, 42 μs after the initial pulse, the detector 18 may output a data point 26 of (42, 67). The detector 18 is configured to output data points 26 each time an ion strike is detected. As the pulse generator 14 is pulsing ions 24 in a multiplexed manner and the ions 24 are likely to have varying masses and mass-to-charge ratios, ion strikes are detected fairly frequently and the detector 18 may continuously or nearly continuously output data points 26. FIG. 6 illustrates an example of data points 26 output by the detector 18 illustrated in the form of a graph 300. Each line, e.g., line 302 and line 304, indicates different concentrations of ions 24. The x-axis indicates times (e.g., in us) and the y-axis indicates an intensity of a detected ion strike. It is noted that the peaks indicate detected ion strikes. It is further noted that the graph of FIG. 6 may continue along the x-axis to illustrate subsequent ion strikes as well. The detector 18 communicates the data points 26 to the data processor 20.

The data processor 20 receives the data points 26 and determines a mass peak curve 28 corresponding to the sample 22 based on the data points 26. The data processor 20 can maintain the raw data points 26 in a multiplexed spectrum. A multiplexed spectrum can be any data structure that contains the raw data points 26. According to some implementations, the data processor 20 smoothes the multiplexed spectrum to obtain a smoothed multiplexed spectrum.

Figure 4:
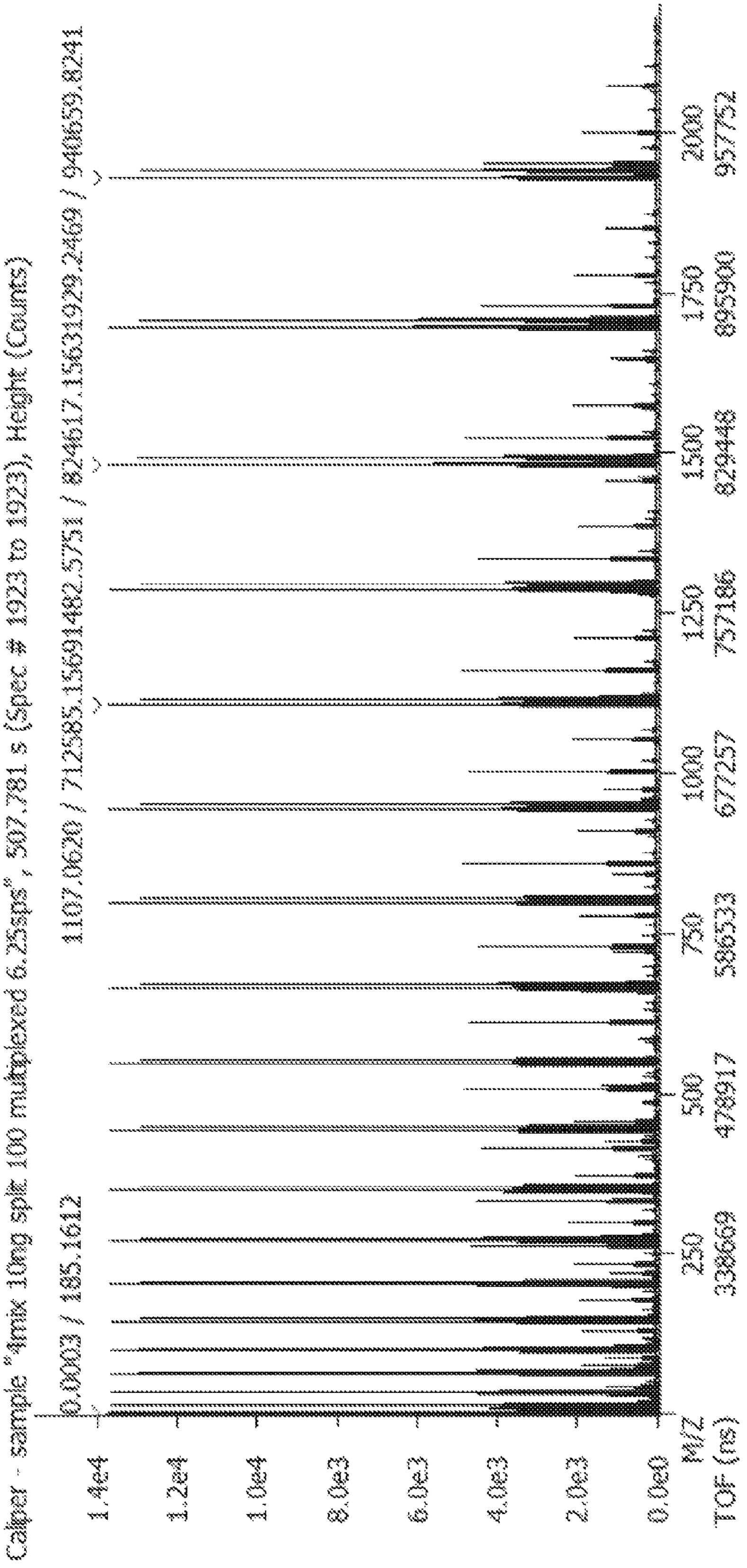
FIG. 4 depicts exemplary data from a multiplexed spectrum according to some implementations of the present disclosure.

An exemplary data set in such a system is provided at FIG. 4. Unlike the results in a non-multiplexed system (as exemplarily illustrated in the chart above) this information is not as readily interpretable, as each spectral peak could have come from any of the ion groups that were simultaneously in flight. Accordingly, there is generally no readily apparent mapping of the results from the spectral peak location to a TOF because of this ambiguity. The purpose of a demultiplexing algorithm is to convert the multiplexed spectrum into an unambiguous traditional spectrum.

Implementations and methods for decoding the multiplexed data illustrated in the chart above are described below. In connection with such descriptions, the following terms may be used, each of which shall be accorded a full definition but for ease of disclosure the following general definitions shall be accorded to such terms.

ADC sample—this refers to the data interpreted by the detector in the HRT MS, which samples and stores the voltage periodically. In an implementation, this information is collection every 2/3 ns, but it is appreciated that various sampling times may be used.

Pulser—this refers to an electrical element within the mass spectrometer and is activated to push, or accelerate a group of ions along the flight path.

Transient Period—this refers to the repeating time period during which ADC samples are collected and are generally back to back in time.

Transient—this refers to the vector of ADC samples that the hardware collects during am identified transient period.

Multipulse pulser—this refers to a pulser that may be activated multiple times during a single transient. Accordingly, this type of pulser may be used in connection with implementations of systems utilizing a multiplexed spectrum.

Multipulse acceleration pulser—this refers to a multipulse pulser which is used to accelerate a group of ions through the flight path.

Multipulse acceleration pulser activation times—this refers to a set of times during a transient at which the multipulse accelerations pulsers are activated. These times are relative to the start of the transient. They are substantially the same for every transient and occur on known ADC sample boundaries.

Spectrum—this refers to a sum of transients. This is an element-wise sum of a fixed number of transient vectors Demultiplexed Spectrum—this refers to a traditional spectrum that is produced by applying a demultiplexing algorithm to a multiplexed spectrum.

Mod—this refers to a modulo operator. For example, X mod Y is the remainder when X is divided by Y. If X is negative, then the result is (X+Y) mod Y.

Population of a spectrum—this refers to the proportion of points within a spectrum that are nonzero.

T—this refers to the length of the transition period in ADC samples.

N—this refers to the number of acceleration pulses occurring during a transient.

Input: A={A0, A1, A2 . . . AN}—this refers to the set of acceleration pulse times in ADC samples.

M—this refers to the multiplexed spectrum, and is the information collected by the detector. This is a vector of summed ADC samples which cover N transient periods.

D—this refers to the demultiplexed spectrum.

For purposes of this disclosure, it is to be appreciated that D and M are both vectors of size T.

Method for Decoding Multiplexed Information Using a Minimum Detection Method

An implementation for decoding information a multiplexed information set in a chromatographic system will now be described.

In an implementation, for each index I in {0 . . . T-1}, the following decoding step for such index is applied to identify a decoded spectrum for such index:

$$D[I]=\text{Minimum}\{M[(I+A0)\bmod T], M[(I+A1)\bmod T], \ldots, M[(I+An)\bmod T]\}$$

In embodiments, the inventors hereof have discovered that high concentration spectral peaks are most likely to be persistent in a given data set. Accordingly, in an implementation, for any given mass, each acceleration pulse is likely to produce a spectral peak and any ions having a substantially common mass X will reach the detector at a consistent time Y. Thus, based on the current disclosure, ions of mass X will produce peaks the summed spectrum at a consistent time after each acceleration pulse.

In an implementation, the foregoing described minimum method identifies ions of a common mass by iterating over all possible times Y (I if the time is represented as an ADC sample). Thus, for example and as described herein, assuming that a spectral peak is persistent, it is expected that there will be corresponding data Y ns after each acceleration pulse, and the minimum will be nonzero.

Method for Decoding Multiplexed Information Using a Bottom Up Method

Another implementation for decoding information a multiplexed information set will now be described.

In implementations, the bottom up method associates spectral information associated with each of the acceleration pulses, thereby improving the sensitivity, selectivity and mass accuracy of the system as compared to non-multiplexed information. In addition, the described implementations can be generally resistant to interferences that can occur between spectral peaks from different acceleration pulses, it being appreciated that the reference to interferences is related to sums of at least two spectral peaks—so when the minimum is taken (as described above), spectral points without interferences will be smaller than those with interferences.

In an implementation, the bottom up method applies the concepts discussed above with reference to the minimum method but refines such method in that it is an iterative derivation as discussed below.

In an implementation, first define NthMin(N, S) to be a generalization of the minimum algorithm. Rather than use the smallest value, this step identifies the Nth smallest value. So NthMin(1, S) is exactly equal to Min(S). Next, the foregoing process is repeated Q times.

In summary the following equations are applied, each as a step:

Define $R_q$ as the residual after iteration q. This starts as the input multiplexed spectrum.

Define $D_q$ to be the demultiplexed spectrum after iteration q. The final output spectrum D is $D_Q$.

Define Z to be the transfer vector. It is added to the demultiplexed spectrum and subtracted (after being multiplexed) from the working residual in each iteration. Initially $R_0$=M; $D_0$=0 (the zero vector) and for each iteration q={1 . . . Q}: $Z_q$=NthMin(q, $R_{q-1}$) and ScaleFactor=(Q-q+1)

The inventors hereof have found that the foregoing application of the method conserves the total intensity of the information. In other words, in a implementation, spectral peak area is being transferred from multiple (Q-q+1) locations in the multiplexed spectrum into a single location in the demultiplexed spectrum. As a result, it is preferred to maintain the sum of spectral intensities substantially constant such that the area at that single location must be scaled up. In an implementation, the following steps are utilized to ensure such general intensity conservation: $D_q=D_0+Z_q*$ScaleFactor and $R_q=R_{q-1}-$Multiplex($Z_q$, A). Application of the foregoing steps generally eliminates the corresponding Nth minimum from the residual in all of the locations in which it appears.

In an implementation, the method further includes the step of converting any negative values in $R_q$ to 0. In an implementation, the foregoing process is repeated Q iterations and, after Q iterations, the process stops and the final result is $D_Q$. Further, in an implementation, D, Z, and R are altered in place as the iterations proceed such that a separate record of these vectors for each iteration is not maintained.

In an implementation, the number of iterations (Q) is less than the number of acceleration pulses (N) that occur within a transient such that as Q approaches N, the amount of confirmation from multiple locations in the multiplexed spectrum is lowered and can result in an increase in false positive peaks. In an implementation, Q is substantially at or around 10 when N is at or around 20.

In implementations, the method herein described can yield changes in D from 0 to nonzero. In an implementation, it can be desired to allow only the first Q' iterations to yield this result resulting in Q-Q' steps to add to existing nonzero points which, in turn, incorporates additional data into the summations so that the resultant process more closely approximates summation while generally preventing the introduction of false positives as Q approaches N, the phenomenon which has been previously discussed.

In implementations, this method may be efficiently implemented with a sparse vector for the Z transfer vector thereby more efficiently processing through the information.

In implementations, and utilizing this method, it has been discovered that an NthMin can be computed efficiently by monitoring the number of candidate nonzero multiplexed points for each output index I in 0 . . . T-1. Such monitored information can thereafter be utilized to prune the NthMin calculation for later iterations. For example, and without limitation, if N=20, in a first iteration, the method identifies 20 nonzero points in M for index I. But suppose it only finds 5, thereafter, index I may not need to be considered for iteration 2 through 15.

Method for Decoding Multiplexed Information Using a Buster Method

Figure 1:
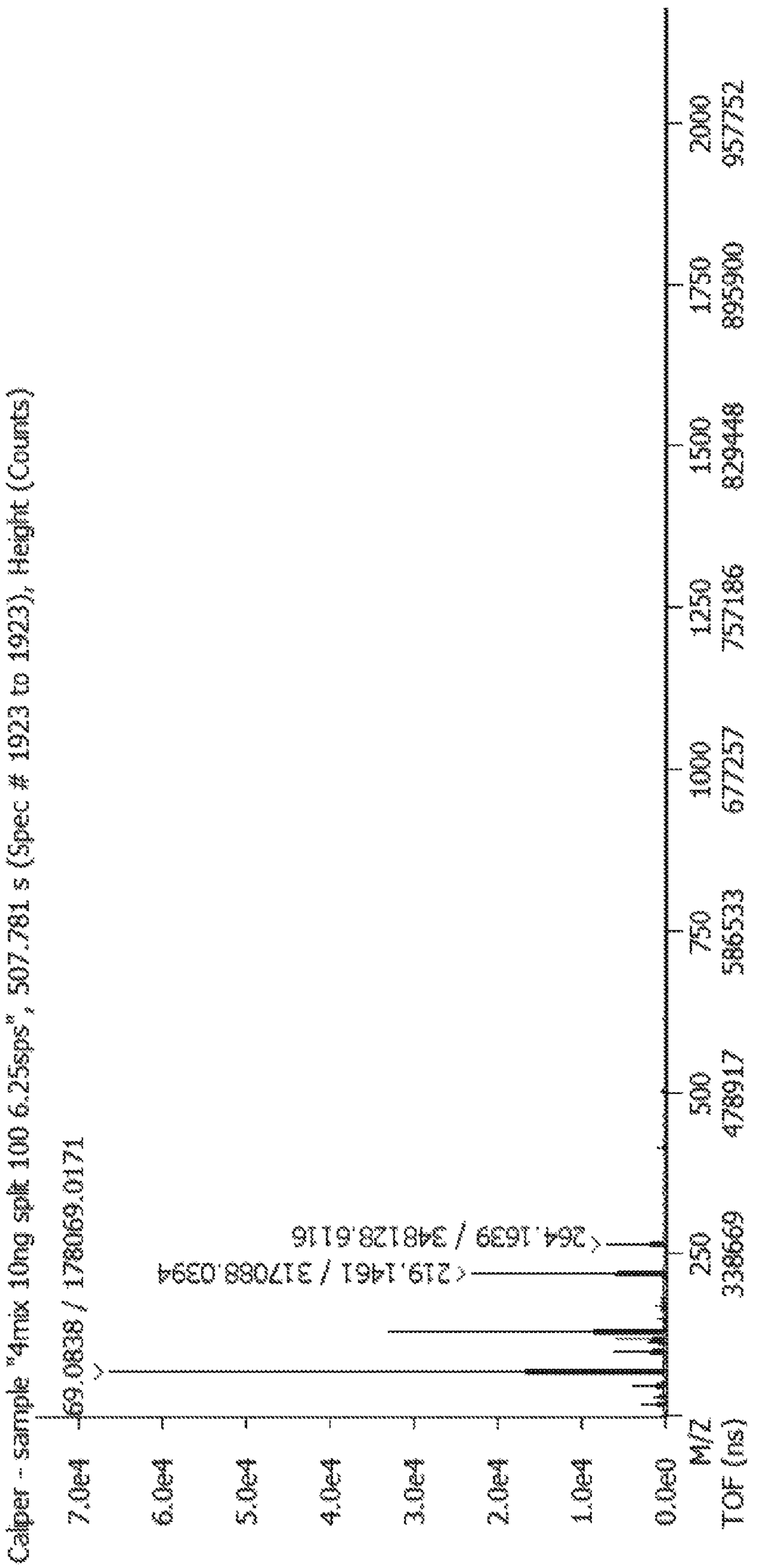
FIG. 1 depicts exemplary results from a traditional time-of flight mass spectrometer according to some implementations of the present disclosure.
Figure 5:
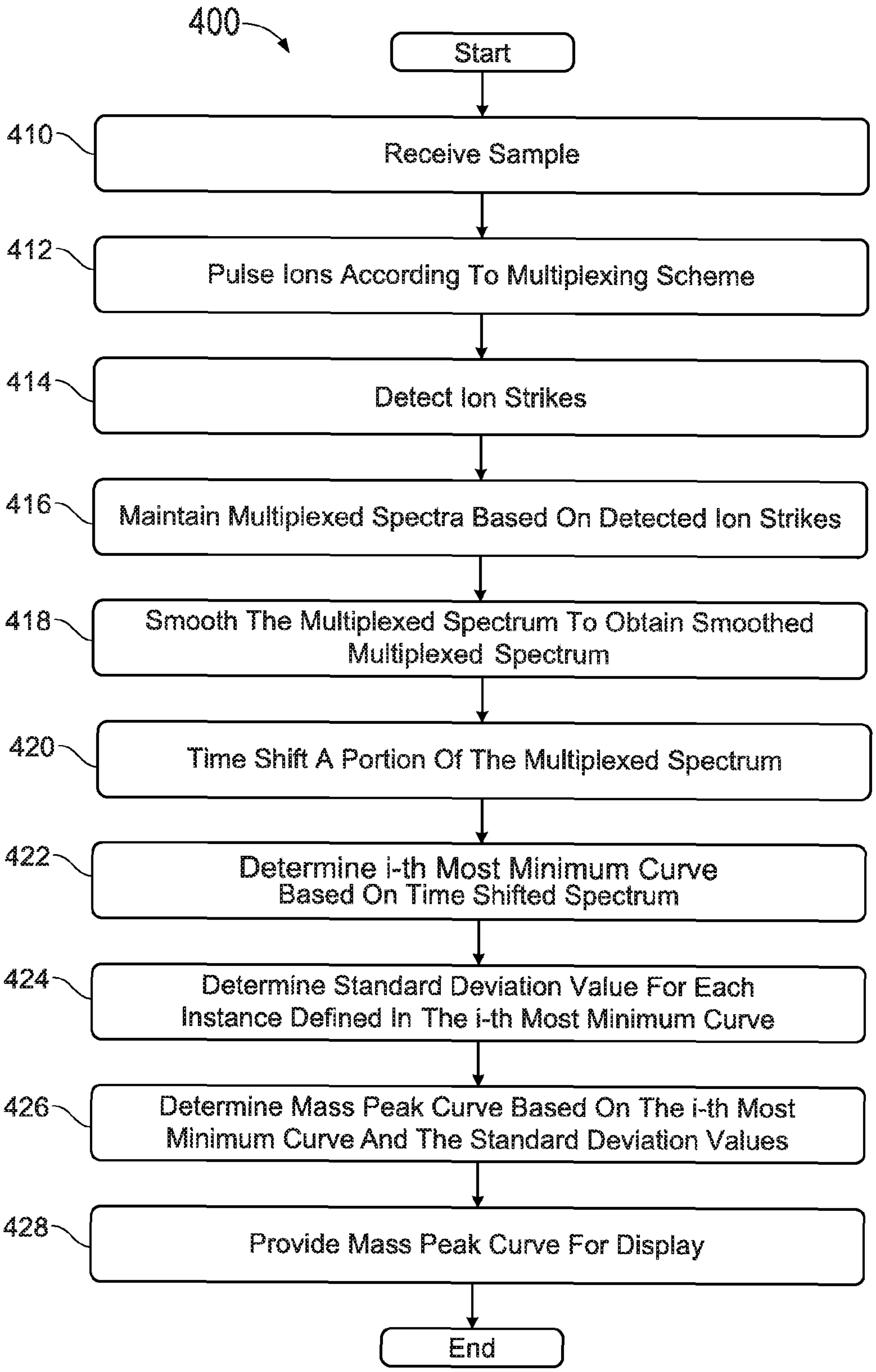
FIG. 5 is a flow chart illustrating an example set of operations for a method for operating a mass spectrometer.

Referring now to FIG. 5, an example set of operations for a method 400 for operating a mass spectrometer that is configured to multiplex ion packets. For purposes of explanation, the method 400 is described with respect to the mass spectrometer 10 of FIG. 1. It is noted that the method 400 may be applied to other suitable mass spectrometers 10 without departing from the scope of the disclosure.

At operation 410, a sample 22 is received at the ion source 12. At operation 412, the ion source 12 generates ions 24. The ion source 12 can generate the ions 24 from the sample 22 in any suitable manner. The ions 24 are fed from the ion source 12 to the pulse generator 14.

At operation 412, the pulse generator 14 pulses the ions 24 into the analyzer 16 according to a multiplexing scheme. As previously discussed, the multiplexing scheme may be divided into intervals, and each interval may be divided into non-periodic subintervals. In some implementations, each interval is divided into the same subintervals as the other intervals. In this way, the subintervals within an interval are non-periodic, but the intervals are periodic, i.e., the first interval to of each interval is of the same duration, as is the second subinterval, the third subinterval, and so on and so forth.

At operation 414, the detector 18 detects the ion strikes, and in response to the ion strikes outputs data points 26 indicating the intensity and the time of the detected ion strike. At operation 416, the data processor 20 maintains a multiplexed spectrum based on the collected data points 26. FIG. 6 illustrates an example of a multiplexed spectrum in a graph 300 format. Each time the detector 18 outputs a data point 26, the data processor 20 can include the data point 26 in the multiplexed spectrum. At this juncture, the multiplexed spectrum can be referred to as "raw data."

Figure 7:
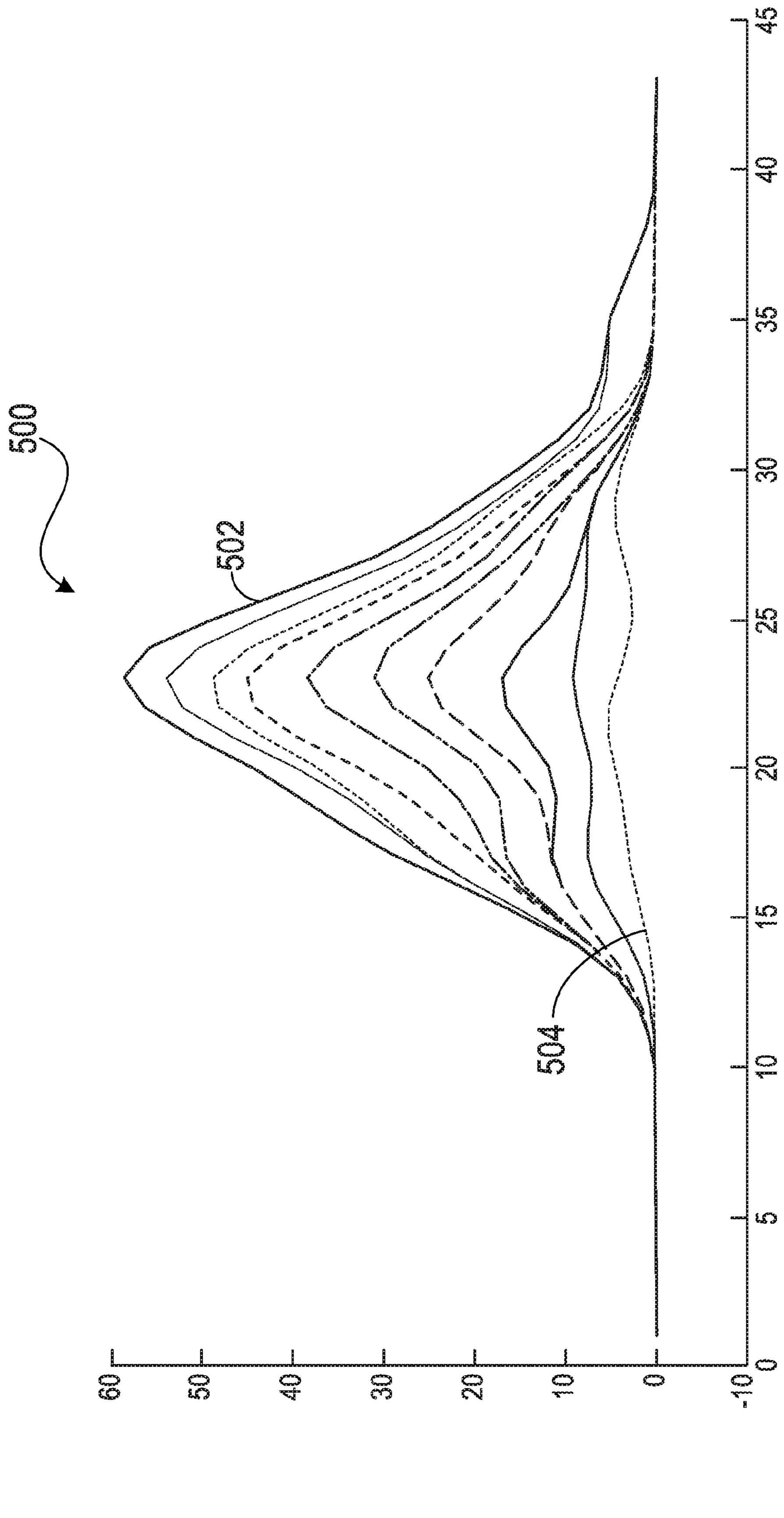
FIG. 7 is a drawing illustrating an example of smoothed multiplexed spectra according to some implementations of the present disclosure.

At operation 418, the multiplexed spectrum is optionally smoothed to obtain a smoothed multiplexed spectrum such as that which is shown at FIG. 7. In some implementations, the detector 18 performs time-of-flight smoothing and retention time smoothing on the multiplexed spectrum. In some of these implementations, the data processor 20 smoothes the multiplexed spectrum along the time-of-flight (TOF) axis in a way that accommodates the highest mass and lowest intensity. This TOF smoothing can have the effect of slightly reducing the mass resolution of the spectrometer. In addition, an intensity dependent smoothing (statistics filter) can provide the advantage of smoothing the lower signals while leaving the more intense mass signals unsmoothed so that resolution is retained. It is noted that any suitable smoothing kernel may be implemented. For example, the TOF smoothing can be Gaussian, box-car, Butterworth and the like. In some implementations, to ensure proper TOF axis smoothing, the mass resolution, detector width, and highest mass are known a priori. For GC data, a mass resolution of 30 k at m/z=1000 is assumed, as is a detector width of 2 ns. Furthermore, for the high resolution time (HRT), a simplified mass calibration of $$\text{TOF(ns)}=20{,}000*\sqrt{M} \quad (1)$$

is assumed. The TOF for mass 1000 is approximately 632,000 ns. Thus, for a mass 1000, a full-width-half-height (FWHH) of the mass peak can be given by $$FWHH(\text{ns}) = \frac{TOF}{2*R} = \frac{632{,}000 \text{ ns}}{2*30000} \approx 10 \text{ ns}. \quad (2)$$

It is noted that the foregoing values are provided for example only. In this example, the smoothing kernal used is a Gaussian filter with a FWHH equal to one-half the FWHH of the mass 1000 peak.

As can be appreciated, the smoothed multiplexed spectra 502 and 504 provide a much more defined shape than the counterpart spectra 302 and 304. In an implementation, TOF smoothing may have the effect of decreasing the mass resolution of the mass spectrometer 10.

With respect to retention smoothing, the data points 26 of a multiplexed spectrum are smoothed along the retention axis. As was the case with TOF smoothing, retention smoothing can be any suitable smoothing technique. For example, the retention smoothing can be Gaussian, box car, or Butterworth.

Figure 8:
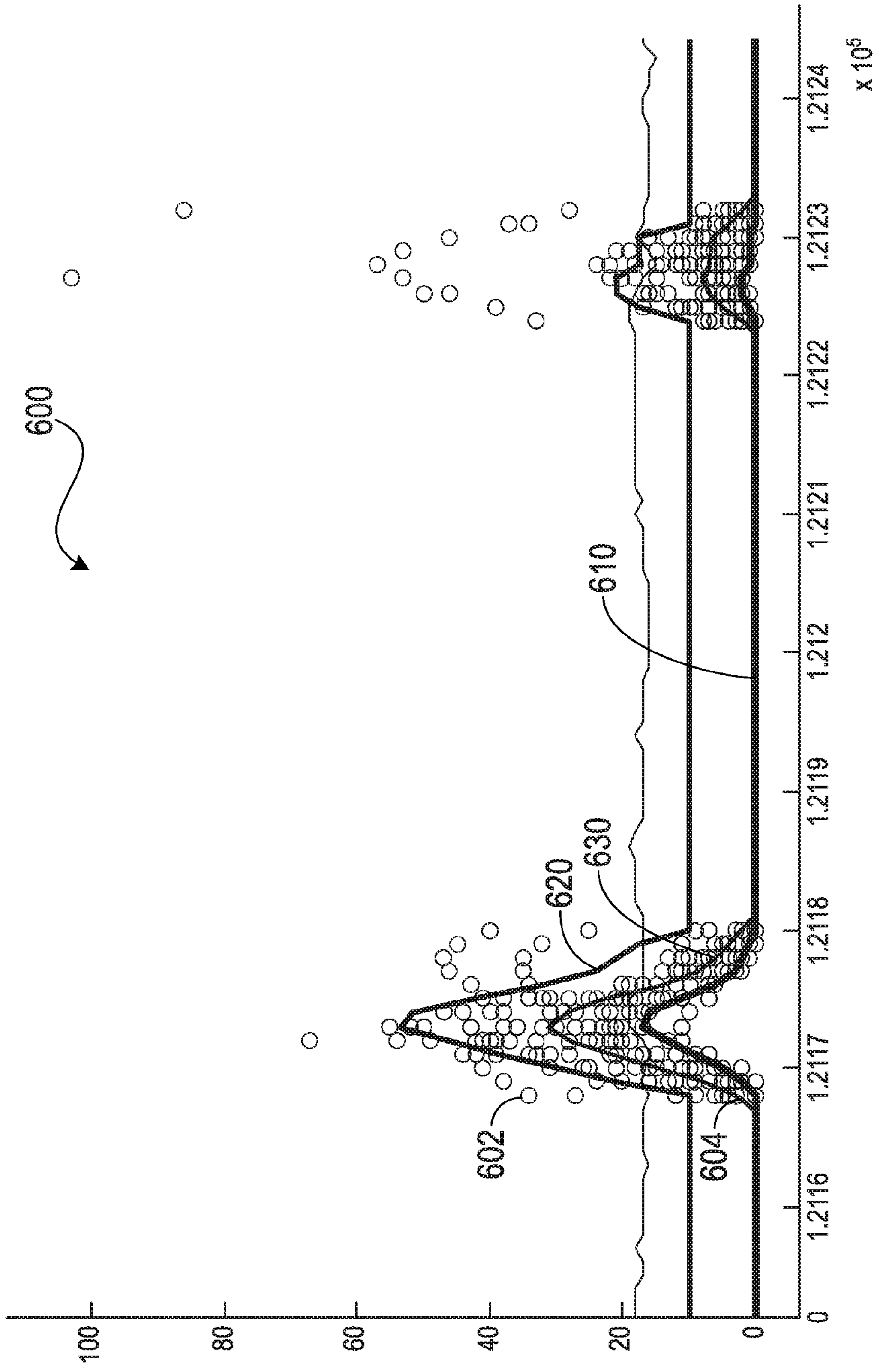
FIG. 8 is a drawing illustrating an example of a time shifted multiplexed spectrum and a mass peak curve according to some implementations of the present disclosure.

At operation 420, the data processor 20 time shifts a portion of the multiplexed spectrum to obtain a time shifted spectrum. In some implementations, the data processor 20 time shifts the data points 26 in the multiplexed spectra. The data processor 20 can time shift a data point 26 by subtracting the time duration of the previous subintervals from the time value in the data point 26. For example, if an ion strike of intensity 78 is detected in a third subinterval, e.g., 127.1 μs, and the time duration of the first and second subintervals is collectively 99.5 μs, then the data point 26 corresponding to the detected ion strike (78, 127.1) is time shifted by 99.5 μs, resulting in a time shifted data point of (78, 27.6). The data processor 20 can time shift each data point 26 (data points 26 detected in the first subinterval are time shifted by zero seconds). FIG. 8 illustrates an example of time shifted data points plotted on a graph 600. In the graph 600, data points appearing at the same time, i.e., along the x-axis, represent data points that occurred during different time intervals. For example, data point 602 and data point 604 represent intensities measured at during different time intervals and at least one of data point 602 and data point 604 was time shifted to the time value T.

At operation 422, the data processor 20 determines the i-th most minimum curve based on the time shifted spectrum. The i-th most minimum curve represents the i-th most minimum time-shifted data points at each time instance. In some implementations, i=2, such that the i-th most minimum curve represents the second least detected intensity at each time instance. FIG. 8 illustrates an i-th most minimum curve 610 derived from the time shifted spectrum, where i=2. In order to determine the i-th most minimum curve, the data processor 20 can identify each time instance in the time shifted spectrum and sort the data points corresponding to the time instance based on the respective intensity of each data point. After sorting, the data processor 20 can select the i-th most minimum point at each time instance for inclusion in the i-th most minimum curve 610.

Figure 9:
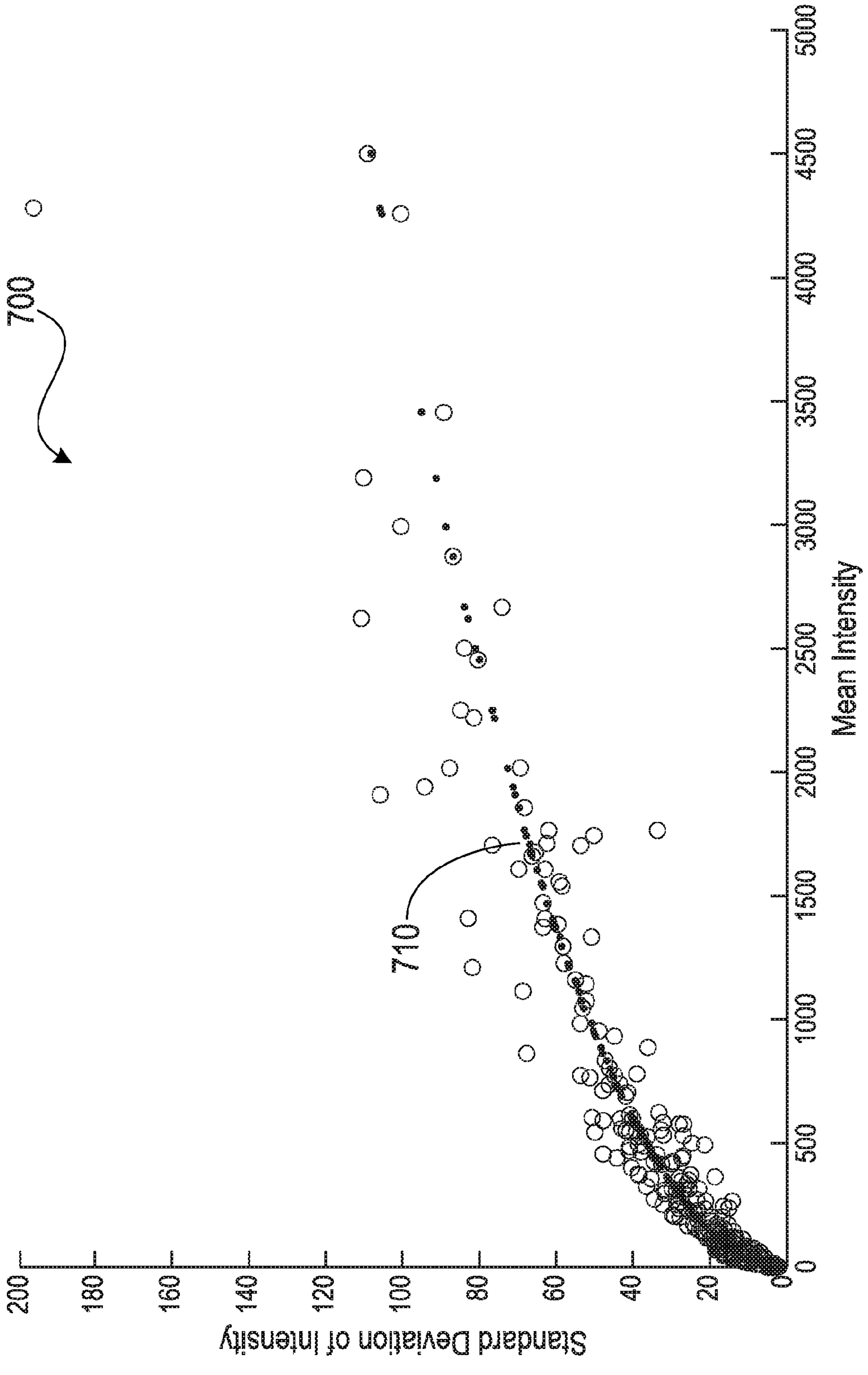
FIG. 9 is a drawing illustrating an example of a standard deviation curve according to some implementations of the present disclosure.

At operation 424, the data processor 20 determines a standard deviation value, σ, corresponding to each intensity value. In some implementations, a standard deviation curve or look-up table is experimentally determined ahead of time. FIG. 9 illustrates an example of a standard deviation curve 700. The standard deviation curve 700 shows standard deviation values as a function of intensity. The data processor 20 determines the standard deviation value σ based on the smoothed intensity value and the standard deviation curve 700 or a look-up table (or any other analogous structure) that relates standard deviation values to intensity values.

At operation 426, the data processor 20 determines the mass peak curve for the sample based on the i-th most minimum curve 610 and the standard deviation values corresponding to the sampled time instances on the i-th most minimum curve 610. According to some implementations, the data processor 20 determines an upper bound curve 620 and determines the mass peak curve 630 based on the data points between the i-th minimum curve 610 and the upper bound curve 620. In these implementations, the data processor 20 multiplies the intensity value of the i-th most minimum curve 610 at each time instance by j*σ, where j is a number greater than one. In some implementations, j=4, such that the data processor 20 multiplies each intensity value of the i-th minimum curve 610 by 4σ, whereby σ corresponds to the time instance corresponding to the intensity value. Once the data processor 20 has determined the upper bound curve 620, the data processor 20 samples the data points between the upper bound curve 620 and the i-th minimum curve 610 for each specific time instance. For each time instance, the data processor 20 can, for example, calculate a mean value of the sampled data points corresponding to the time instance or can determine a median value of the sampled data points to obtain a value of the mass peak curve 630 corresponding to the time instance. It is noted that the data processor 20 can determine other statistically significant values other than mean or median to determine the values of the mass peak curve 630.

In some operations, the data processor 20 determines the mass peak curve of the sample 22 by multiplying each intensity value along the i-th minimum curve 610 by the 2σ corresponding to the time interval of the intensity value. In these implementations, the data processor 20 does not calculate the upper bound curve 620 and does not sample the data points above the i-th minimum curve 610. Rather, the data processor 20 is configured to estimate that the mass peak curve is roughly 2σ+ the mass peak curve 630.

At operation 428, the data processor 20 provides the mass peak curve 630 for display at a display device 21. The display device 21 can display the mass peak curve 630 to a user.

It is noted that variations of the method are contemplated and are within the scope of the disclosure.

Method for Decoding Multiplexed Information Using a Hybrid Method of the Bottom Up and Buster Methods After understanding the previously disclosed methods, it is to be appreciated that the Buster method and the Bottom Up methods each have variant strengths and weaknesses in their application. As an accommodation thereof, and recognizing each strength and weakness, the inventors hereof have identified that it may be preferred to combine the strengths of each method to bolster the results thereof.

For example, while the Bottom Up method may be resistant to interference, for each iteration Q, a minimum amount of area is transferred to the demultiplexed spectrum. Interfering spectral peaks from other acceleration pulses are quickly subtracted from the residual. In addition, because the Bottom Up method utilizes small artifacts, false positive peaks are small and relatively easy to use. Some perceived shortfalls of the Bottom Up method however, is the efficiency of the iterative process on dense spectral information and may not represent the full spectral information from all multiplexed pulses as it concludes after Q iterations.

With reference now to Buster, it is quite efficient as it makes a single pass over the data; incorporates the full data set from the multiplexed pulses (when there are no significant interferences.) But significant spectral interferences may yield artifacts, for example, due to two adjacent demultiplexed indices (due to computed thresholds as discussed.)

A hybrid approach of BottomUp and Buster can help resolve the discussed shortfalls and integrate the strength.

In an implementation, the BottomUp Method is utilized on M for a low number (Q) of iteration, thereby substantially removing spectral interferences from the multiplexed spectral information and thereby yielding two spectra, namely: (i) a demultiplexed spectrum ($D_Q$) that contains the large spectral peaks; and (ii) a residual multiplexed spectrum ($R_Q$) that contains the leftover spectral data after subtraction.

In an implementation, the Buster method is thereafter applied to identify any remaining information within the residual multiplexed spectrum ($R_Q$) as follows: At each index I in 0 . . . T-1: Use $D_Q$ to compute the buster inclusion threshold and use this threshold to transfer points from $R_Q$ into the buster demultiplexed spectrum B. Next, identify the resulting spectrum $D=R_Q+B$ In an implementation, the threshold can be computed $D_0$ and $Z_Q$, the last transfer vector thereby allowing the the same threshold determination as normal (rather than using $D_Q$ to compute the buster threshold.)

In addition, two or more Buster iterations may be processed. In an embodiment, two buster iterations are used. In an implementation, the first iteration can reconstruct the indices which are nonzero in $D_Q$. It can then mark them as being used so the second iteration will not use them. In an implementation, the second buster iteration reconstructs indices which are zero in $D_Q$ thereby yielding small peaks to be reconstructed without interference from large peak residuals.

Method for Decoding Multiplexed Information Using a Top Down Method

Another implementation for decoding information a multiplexed information set in a chromatographic system will now be described.

In contrast to the minimum method described above, the multiplexed information can be decoded by applying an identification of the likely largest points in the demultiplexed spectrum, then work down the side of the spectral peaks to thereby decode the largest points first.

An example of such method will now be described. First, a priority queue is created having entries. In an implementation, each entry in the priority queue has a demultiplexed index and a demultiplexed value. The queue is ordered such that the maximum demultiplexed value is always at the front of the queue. Next, the following steps are undertaken for each demultiplexed index i: (i) for each demultiplexed index i, compute the demultiplexed intensity that is the sum of all multiplexed source points for I; this will hereinafter be referenced as sum (S); (ii) next, add (i,s) to the priority queue. In an implementation, the next step is applied: while the priority queue is not empty and the largest value is greater than a termination threshold: (i) remove the highest intensity point from the queue. This has index i,value s; (ii) recompute s for index I—this is the sum of all multiplexed points for I, this will now be referenced as recomputed sum s' and the consumed points will be treated as “the average of the others” while computing this sum; (iii) if s doesn’t equal s', add (i,s') back to the queue and proceed to the next queue entry—otherwise, s equals s'—in either instance, add s to D[i] to thereby transfer the intensity to the demultiplexed spectrum; and (iv) identify all of the multiplexed source intensities as consumed.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms “machine-readable medium” and “computer-readable medium” refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term “machine-readable signal” refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms “data processing apparatus”, “computing device” and “computing processor” encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method comprising:

pulsing ions from an ion source through an analyzer according to a predetermined multiplexing scheme, each pulse including one or more ions corresponding to a sample;

detecting a plurality of ion strikes at a detector determining a data point for each ion strike, wherein each data point includes an intensity of a detected ion strike and a time of the detected ion strike;

maintaining a multiplexed spectrum of the data points, the multiplexed spectrum including the data points;

decoding the multiplexed spectrum.

2. The method of claim 1, further comprising:

time shifting a portion of the multiplexed spectrum based on the multiplexing scheme to obtain a time shifted spectrum;

identifying an i-th most minimum of the time shifted distribution, the i-th most minimum identifying the i-th most minimum intensity at a plurality of time instances, wherein i is an integer greater than zero; and determining a mass peak curve of the sample for the interval based on the multiplexed spectrum, the time adjusted spectrum, and the i-th most minimum.

3. The method of claim 1, wherein the predetermined multiplexing scheme divides a time interval into N subintervals, where the subintervals are divided in a non-periodic, non-repeating manner.

4. The method of claim 3, wherein a time duration of each subinterval of the time interval is unique.

5. The method of claim 3, wherein each time interval is divided into subintervals according to the predetermined multiplexing scheme.

6. The method of claim 2, further comprising:

performing one or both of time of flight smoothing and retention time smoothing of the multiplexed spectrum.

7. The method of claim 2, wherein determining the mass peak curve includes:

identifying a time instance for each data point in the i-th most minimum;

for each time instance:

identifying a smoothed intensity at the sample time in the multiplexed spectrum;

determining a multiplier corresponding to the time instance based on the intensity; and determining a value of the mass peak curve at the sample time based on the data point corresponding to the sample time and the multiplier.

8. The method of claim 7, wherein the multiplier is proportional to a standard deviation value that is determined from a standard deviation curve that defines standard deviation values as a function of intensity values.

9. The method of claim 2, wherein determining the mass peak curve includes:

identifying a time instance for each data point on the i-th most minimum; identifying an upper bound based on the i-th most minimum;

for each time instance, determining an intensity value on the mass peak curve corresponding to the time instance based on a set of data points between the i-th most minimum and the upper bound curve and corresponding to the time instance.

10. The method of claim 9, wherein the value of the mass peak curve is one of a median intensity value of the set of data points and a mean intensity value of the set of data points.

11. The method of claim 1, further comprising:

smoothing the multiplexed spectrum to obtain a smoothed multiplexed spectrum.

12. The method of claim 2, wherein the i-th most minimum is the median.

13. A mass spectrometer comprising:

an ion source;

an analyzer;

an pulse generator that pulses ions from an ion source through the analyzer according to a predetermined multiplexing scheme, each pulse including one or more ions corresponding to a sample;

a detector coupled to the analyzer that detects a plurality of ion strikes and determines a data point for each ion strike, wherein each data point includes an intensity of a detected ion strike and a time of the detected ion strike;

a data processor that:

maintains a multiplexed spectrum of the data points, the multiplexed spectrum including the data points;

time shifts a portion of the multiplexed spectrum based on the multiplexing scheme to obtain a time shifted spectrum;

identifies an i-th most minimum of the time shifted distribution, the i-th most minimum identifying the i-th most minimum intensity at a plurality of time instances, wherein i is an integer greater than zero;

determines a mass peak of the sample for the interval based on the smoothing multiplexed spectrum, the time adjusted spectrum, and the i-th most minimum;

and a display device that displays the mass peak.

14. The mass spectrometer of claim 13, wherein the predetermined multiplexing scheme divides a time interval into N subintervals in a non-periodic, non-repeating manner.

15. The mass spectrometer of claim 14, wherein a time duration of each subinterval of the time interval is unique.

16. The mass spectrometer of claim 14, wherein each time interval is divided into subintervals according to the predetermined multiplexing scheme.

17. The mass spectrometer of claim 13, wherein the data processor smoothes the multiplexed spectrum by performing one or both of time of flight smoothing and retention time smoothing of the multiplexed spectrum.

18. The mass spectrometer of claim 13, wherein the data processor determines the mass peak curve by:

identifying a time instance for each data point in the i-th most minimum;

for each time instance:

determining a multiplier corresponding to the time instance based on the smoothed intensity; and determining a value of the mass peak at the sample time based on the data point corresponding to the sample time and the multiplier.

19. The mass spectrometer of claim 18, wherein the multiplier is proportional to a standard deviation value that is determined from a standard deviation curve that defines standard deviation values as a function of intensity values.

20. The mass spectrometer of claim 19, wherein the data processor determines the mass peak by:

identifying a time instance for each data point on the i-th most minimum; identifying an upper bound curve based on the i-th most minimum;

for each time instance, determining an intensity value on the mass peak corresponding to the time instance based on a set of data points between the i-th most minimum and the upper bound curve and corresponding to the time instance.

21. The mass spectrometer of claim 20, wherein the value of the mass peak is one of a median intensity value of the set of data points and a mean intensity value of the set of data points.

* * * * *